Nov. 24, 1964       J. C. STERNBERG ET AL       3,158,446
                         GAS DETECTOR

Filed Jan. 15, 1962                         2 Sheets-Sheet 1

*INVENTOR.*
JAMES C. STERNBERG
BY DAVID T.L. JONES
Robert M. Taylor, Jr.
ATTORNEY Nov. 24, 1964    J. C. STERNBERG ET AL    3,158,446
GAS DETECTOR Filed Jan. 15, 1962    2 Sheets-Sheet 2

*INVENTOR.*
JAMES C. STERNBERG
BY DAVID T. L. JONES
Robert M. Taylor, Jr.
ATTORNEY United States Patent Office 3,158,446
Patented Nov. 24, 1964

3,158,446
GAS DETECTOR
James C. Sternberg and David T. L. Jones, Fullerton, Calif., assignors to Beckman Instruments, Inc., a corporation of California
Filed Jan. 15, 1962, Ser. No. 168,570
13 Claims. (Cl. 23—254)

This invention relates to a detector and more particularly relates to a detector for detecting the presence of various constituents in a flowing gas stream.

Detectors of various types have been provided in the past for determining the constituents in the effluent from a chromatograph column. Two of the more widely used of these detectors employ a burner coupled to the outlet of the column and utilize hydrogen as a carrier gas and as fuel for the burner. In the first of these detectors, the hydrogen flame ionization detector, increased ionization in the flame occurs during the presence of organic compounds in the flame, the increased ionization being sensed by suitable electrical circuitry to indicate their presence. In the second detector, the thermal hydrogen flame detector, temperature changes resulting from the presence of sample substances in the flame are monitored by a small thermocouple placed above the reaction zone of the flame. While the hydrogen flame ionization detector is more sensitive than the thermal hydrogen flame detector, the latter is sufficient for many applications and is often preferable because of the relative simplicity of the electrical circuitry that can be used therewith.

Even though the hydrogen flame ionization detector is extremely sensitive and generally satisfactory for most applications, in others it does not have the selectivity that is necessary for meaningful results. For example, in testing food for residual insecticides the detector does not sufficiently distinguish between halogen or sulfur containing compounds and carbon containing compounds. Similarly, the thermal hydrogen flame detector is not sufficiently selective for this application, nor are any of the other commonly used chromatographic detectors. As a result, various efforts have been made to provide a detector that will be selective to halogen and sulfur containing compounds in the presence of carbon containing compounds.

One method that has been proposed to overcome this deficiency of the standard chromatographic detectors, at least so far as chlorine containing compounds are concerned, comprises mixing the chromatographic effluent with oxygen and then passing the mixture into a combustion chamber. The products of combustion are passed into a scrubber, and the chlorine content of the scrubber liquid is continuously titrated with coulometrically generated silver ion in a coulometer cell employing two sensing and two generating electrodes. The sensitivity and selectivity of this method for chlorinated compounds is generally adequate, but it is inadequate for sulfur, and the apparatus required for carrying it out is single purpose, complex and quite expensive.

According to the present invention, it has now been found that a detector may be provided that is extremely sensitive and selective to halogen and sulfur containing compounds as compared to carbon containing compounds, the halogens or sulfur giving $10^4$ or $10^5$-fold greater response than carbon. This superior operation is accomplished by measuring the electrical conductivity of a thin film of flowing solution which extracts soluble combustion products from the exhaust gas of a burner such as that used in either of the hydrogen flame detectors mentioned above or which, in some cases, extracts soluble compounds directly from the column effluent. The apparatus necessary is extremely simple and inexpensive and in no way affects the operation of the hydrogen flame detectors with the result that all the useful properties of these detectors may also be concurrently employed to achieve a detection system more versatile and complete than any heretofore known.

It is therefore a primary object of the present invention to provide a detector that is sensitive and selective to halogen and sulfur containing compounds.

It is another object of the present invention to provide such a detector for use with a gas chromatograph.

It is also an object of the present invention to provide such a detector for use with a burner such as those used in hydrogen flame detectors and which does not adversely affect the operation of these detectors.

It is a further object of the present invention to provide a detector in which the exhaust gases of a hydrogen flame detector are dissolved in a thin stream of flowing liquid.

It is a still further object of the present invention to provide a detector in which changes in conductivity of a flowing stream due to the absorption therein of exhaust gases from a burner is sensed to give an indication of the presence of halogens or sulfur in the gases.

It is another object of the present invention to provide a detection system including a hydrogen flame detector and a detector extremely sensitive to the presence of halogens or sulfur in the exhaust gases of the hydrogen flame detector.

These and further objects and advantages of the invention will become more apparent upon reference to the following specification and claims and appended drawings wherein:

Figure 1:
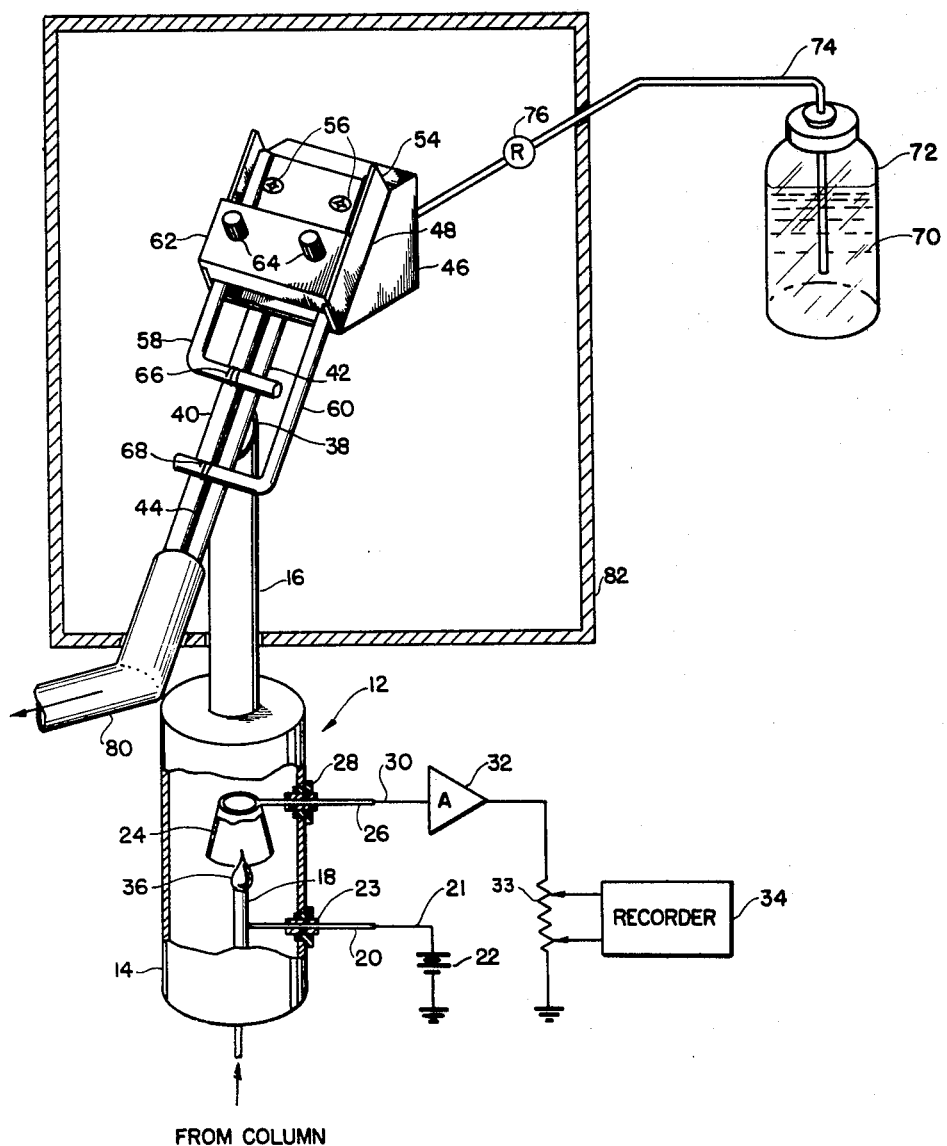
FIG. 1 is a perspective view partly in section of the detection system of the present invention.

Referring now to FIG. 1, there is shown a hydrogen flame ionization detector, generally indicated at 12, having a housing 14 (partly broken away in the interest of clarity) and a chimney 16. Enclosed in the housing 14, directly below the chimney 16, is a burner or jet 18 which is coupled in a well known fashion to the outlet of any standard chromatographic column (not shown). A preferably rigid electrical conductor 20 has one end in electrical connection with the burner or jet 18 and its other end connected by a suitable conductor 21 to the positive terminal of a battery 22 whereby the burner or jet 18 is given a positive polarity. The conductor 20 is electrically insulated from the housing 14 in any well known fashion, for example, by an insulating plug 23.

A collector electrode 24, preferably in the shape of a truncated cone, is positioned in the housing 14 directly above the burner or jet 18. The collector electrode 24 is supported in place by a rigid conductor 26 which may be made integral therewith or otherwise suitably connected thereto and which, as in the case of the conductor 20, is insulated from the housing 14 by means of an insulating plug 28. The free end of the conductor 26 is connected by a conductor 30 to the input of a suitable amplifier 32. The output of the amplifier 32 is connected to ground through a resistor 33 and a recorder 34 is connected across a suitable portion of this resistor.

The operation of the above-described hydrogen flame ionization detector is well known and therefore only a short description appears necessary. If hydrogen or another suitable combustible gas is used as the carrier gas in the chromatographic column, or added to the carrier gas between the chromatographic column and the burner, a flame 36 may be established at the tip of the burner 18. A potential is impressed across this flame by the battery 22 and the polarized burner or jet 18 and collector electrode 24. The presence of organic compounds in the effluent leaving the chromatographic column will cause an increase of ionization in the flame 36. The increased ionization will cause a higher current to flow through the amplifier 32 and recorder 34, the latter providing a highly sensitive chronological record of the presence of organic compounds in the column effluent.

Figure 2:
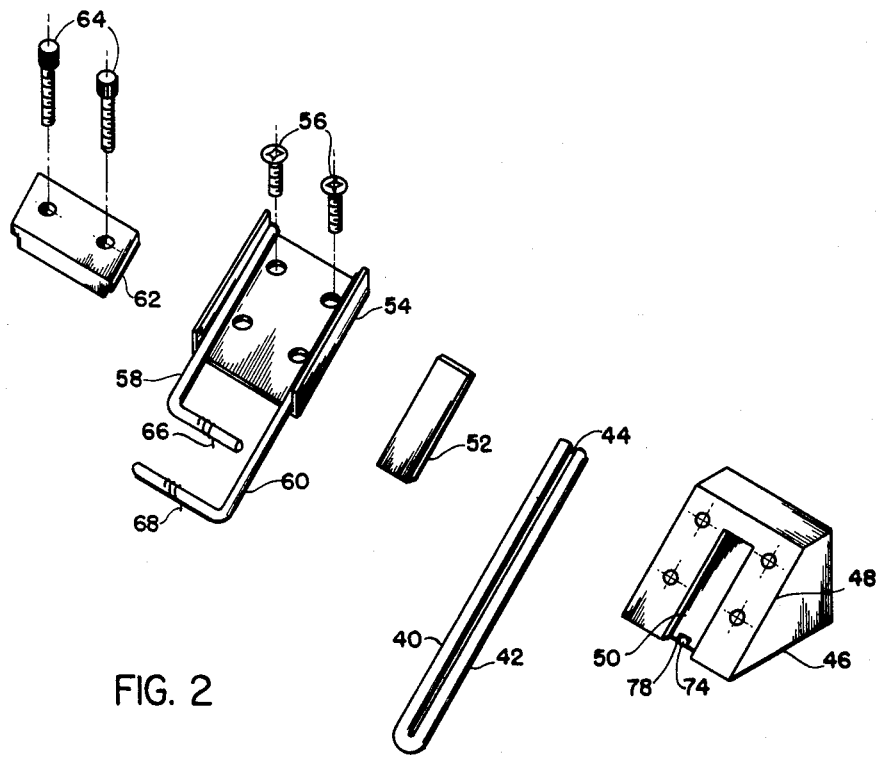
FIG. 2 is an exploded perspective view of a detector used in the system of FIG. 1.

As pointed out previously, the hydrogen flame ionization detector is not sufficiently selective of halogen and sulfur compounds as is desired for many applications. The present invention therefore provides a second detecting device sensitive to halogen and sulfur containing compounds which may be used in cooperation with the hydrogen flame detector without affecting the latter's performance in any way. Referring to FIGS. 1 and 2, there is shown a pair of parallel rods 40 and 42 made of any suitable non-conducting material, preferably glass, and separated by a narrow slot 44. The upper end of the rods 40 and 42 are supported on a block 46 having a sloping front face 48. The front face 48 is provided with a rectangular groove 50 into which fit the ends of the rods 40 and 42.

A rectangular block 52 having the same general size and shape as the groove 50, but with a smaller height, is positioned over the ends of the rods 40 and 42 lying in the groove 50 and is held in place by a generally U-shaped bracket 54. The bracket 54 is bolted to the block 46 by a pair of bolts 56. A pair of L-shaped members 58 and 60 are positioned on the bracket 54 in opposite directions and are held in place by a generally T-shaped locking member 62. The locking member 62 is fastened to the block 46 by means of bolts 64.

The L-shaped members 58 and 60 may be made of any suitable non-conducting material, preferably glass, and are provided with different length leg portions. As shown, the leg portion of the member 60 is longer than the leg portion of the member 58 but this may, of course, be reversed. A wire or electrode 66 is wrapped around the base of the member 58 and extends into the slot 44 between the rods 40 and 42. A similar wire or electrode 68 is wrapped around the base of the member 60 and also extends through the slot 44. As may be seen from FIG. 1, the wire or electrode 66 is positioned above or upstream of the slanted end 38 of the chimney 16 while the electrode 68 is positioned below or downstream of the slanted end 38 of the chimney 16. The electrodes 66 and 68 are preferably made of silver coated with silver chloride but may, if desired, be made of other suitable materials such as platinum or gold. The electrodes should be completely covered with a suitable insulating material (not shown), except for the very tips thereof which are positioned in the lower portion of the slot 44.

A supply of a suitable electrolyte 70, for example, purified water, is contained in a suitable receptacle 72. The electrolyte 70 is supplied to the under side of the block 46 by a conduit 74 having a restrictor 76 therein. The conduit 74 terminates immediately adjacent the under surfaces of the rods 40 and 42 and may be positioned in a suitable channel 78 in the block 46 if desired. The electrolyte 70 may be supplied by gravity flow or a suitable pump may be provided in the conduit 74, or a constant pressure may be exerted on the electrolyte by an inert gas introduced into the container. The latter step will protect the electrolyte from contamination.

The elecrolyte 70 flowing through conduit 74 and restrictor 76 forms a thin film of flowing electrolyte on the under surfaces of the rods 40 and 42 and in the slot 44 between the rods. For this purpose, a non-ionic wetting agent may be added to the electrolyte to improve its flow characteristics. A waste pipe 80 is provided at the lower ends of the rods 40 and 42 to carry away the electrolyte leaving the rods. The entire detector just described is surrounded by an enclosure 82 to eliminate drafts and convection currents which may affect operation of the detector. A wick (not shown) or similar means may be provided at the lower ends of the rods to stabilize electrolyte flow from these rods.

Figure 3:
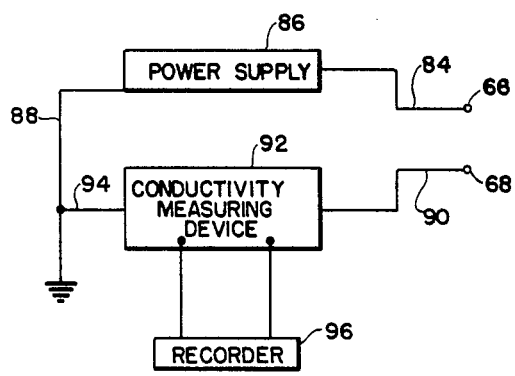
FIG. 3 is an electrical schematic of the circuit used in conjunction with the detector of FIG. 2.

Referring now to FIG. 3, there is shown the electrical circuit coupled to the electrodes 66 and 68. The electrode 66 is connected by a conductor 84 to one side of a power supply 86. The other side of the power supply 86 is connected to ground by a conductor 88. The electrode 68 is connected by a conductor 90 to one side of a conductivity measuring device 92. The other side of the conductivity measuring device 92 is connected to ground by a conductor 94. The output of the conductivity measuring device 92 is connected to a suitable recorder 96. The power supply 86 may be either D.C. or A.C. depending on the conductivity measuring device used. If it is desired to use a D.C. power supply, the conductivity measuring device may be a Beckman 772880 Ionization Electrometer. If A.C. is used, any of a number of well known bridge circuits may be used for the device 92.

The operation of the above-described detector is as follows:

The electrolyte 70 is supplied by gravity feed through conduit 74 and restrictor 76 to the under surfaces of the rods 40 and 42. The restrictor is so chosen that a thin film of flowing electrolyte is formed on the under surface of the rods 40 and 42 and in the slot 44 between the rods. The products of combustion of the flame 36 travel up the chimney 16 and are exhausted through the slanted end 38 of the chimney 16 whereupon they impinge on the thin film of flowing electrolyte. A number of these products of combustion, particularly halogens (in the form of hydrogen halides) and sulfur (in the form of $SO_2$) are dissolved in the flowing electrolyte. If the effluent of the column contained, for example, a chlorine containing compound and a sulfur containing compound, the dissolved products of combustion would cause the formation of hydrochloric acid and sulfurous acid with the result that the conductivity of the electrolyte film between the electrodes 66 and 68 would abruptly increase. The increase in current flow will be sensed by the conductivity measuring device 92 and recorded by the recorder 96, thus giving a continuous record of the presence of halogen or sulfur containing compounds in the column effluent. Since all carbon compounds furnish carbon dioxide in the flame, very little of the increased conductivity of the film would be caused by these compounds, as the hydrolysis of dissolved $CO_2$ to form ionic products is a slow reaction. Because of the conductivity of the pure electrolyte, a high background current may be present in the recording circuit which should be eliminated for maximum performance. This may be done with either of the aforementioned Beckman Ionization Electrometer or bridge circuit as will be apparent to one skilled in the art.

As previously pointed out, the electrodes 66 and 68 are arranged to straddle the burner chimney 16. This has been found to be the optimum position, although the electrodes could be located further downstream if this was desired. Location of the electrodes further downstream, however, leads to some delay in response, and somewhat impairs sample clean-up after the peak has passed. As pointed out previously, the electrodes are preferably constructed of silver-silver chloride. When this type of electrode is used, the process is reversible and thus the signal supplied to the recorder is proportional to the conductance of the solution and is not complicated by a decomposition potential. This problem, of course, does not exist when an A.C. power supply is used.

Although a preferred embodiment of the invention has been described, it should be obvious to those skilled in the art that the invention could take many other forms. For example, as discussed previously, the burner 12 could be a thermal hydrogen flame detector instead of the hydrogen flame ionization detector illustrated and described. In either case, the operation of the burner would be in no way affected by the later use made of its exhaust gases. It should also be obvious that under certain circumstances any burner could be used together with any type fuel, so long as the fuel did not contain halogen or sulfur containing components. In other circumstances, it is not necessary that the gas be burned but could be directed onto the film immediately after leaving the column, either directly or after passing through an unlit hydrogen flame detector.

It should also be obvious that the structure of the halogen and sulfur detector could take many forms. For example, a single rod could be used with the electrodes simply wrapped around it. A single rod could also be provided with the electrodes sealed therein and ground flush with the rod surface and a track buffed onto the rod, the electrodes being aligned along the center of the track. The electrodes could also be removed from the rod and placed in a capillary tube positioned so as to catch the liquid leaving the rod. These and other rod and electrode configurations may be used within the scope of the present invention.

More than two electrodes could be provided if desired. Three electrodes could be provided, the upper pair serving as a reference arm in a half bridge circuit thus permitting bucking out of the background current obtained in the sample arm. The lower pair of electrodes could be located to straddle the chimney 16 so that sample entered only the sample arm of the half bridge.

A number of electrolytes other than purified water could also be used in the practice of the present invention. For example, dilute hydrogen peroxide could be used in order to achieve greater sensitivity for sulfur, as this would oxidize $SO_2$ to $SO_3$, giving fully ionized sulfuric acid. Use of hydrogen peroxide would also give decreased halogen response through oxidation of the halides to free halogens. If it was desired to increase the sensitivity to $CO_2$ (in situations where selectivity between halogens or sulfur and carbon are not essential), barium hydroxide could be used as an electrolyte.

From the above description it may be seen that the present invention provides a simple and inexpensive detector which is extremely sensitive and selective to halogens or sulfur with respect to carbon. It may easily be combined with already existing equipment, such as a hydrogen flame ionization detector, to produce a detection system more versatile and sensitive than any heretofore known. Such a system is extremely useful in many applications, particularly in testing food for residual insecticide.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A detector for determining the presence of various compounds in the effluent of a chromatographic column comprising in combination:
   means for forming a flowing thin film of electrolyte;
   means for directing said effluent onto said thin film of electrolyte whereby said compounds are dissolved in said electrolyte;
   a pair of metal electrodes in contact with said thin film; and
   indicating means coupled to said electrodes for indicating changes in conductivity in said thin film resulting from the dissolution of said compounds in said electrolyte.

2. The detector of claim 1 wherein a first of said electrodes is upstream of the area of said flowing thin film onto which said effluent is directed, and the other of said electrodes is downstream of said area.

3. A detector for determining the presence of halogens and sulfur in the effluent of a chromatographic column comprising in combination:
   means for forming a flowing thin film of electrolyte;
   means for directing said effluent onto said film of electrolyte;
   a pair of metal electrodes immersed in said film; and
   indicating means coupled to said electrodes for indicating changes in conductivity in said film resulting from the dissolution of said halogens and sulfur in said film.

4. A detector for determining the presence of halogens and sulfur in the effluent of a chromatographic column comprising:
   a burner for burning said effluent;
   means for forming a flowing thin film of electrolyte;
   means for directing the products of combustion of said burner onto said film of electrolyte; and
   means for sensing changes in conductivity of said film resulting from the dissolution of said halogens and sulfur in said film.

5. A detector for determining the presence of halogens and sulfur in the effluent of a chromatographic column comprising in combination:
   a burner for burning said effluent;
   means for forming a flowing thin film of electrolyte;
   means for directing the products of combustion of said burner onto said film of electrolyte;
   a pair of electrodes immersed in said film; and
   indicating means coupled to said electrodes for indicating changes in conductivity in said film resulting from the dissolution of said halogens and sulfur in said film.

6. The detector of claim 5 wherein a first of said electrodes is upstream of the area of said flowing thin film onto which said products of combustion are directed, and the other of said electrodes is downstream of said area.

7. A detector for detecting the presence of halogens and sulfur in the effluent of a chromatographic column comprising in combination:
   a burner coupled to said column for burning said effluent;
   a source of electrolyte;
   at least one electrically non-conductive rod supported over said burner;
   means for directing the products of combustion of said burner onto at least a portion of said rod;
   means for supplying electrolyte from said source to said rod to form a thin film of flowing electrolyte on the lower surface of said rod whereby the products of combustion of said burner are directed onto said thin film of electrolyte; and means for sensing changes in conductivity of said thin film of electrolyte resulting from the dissolution of said halogens and sulfur in said thin film.

8. A detector for detecting the presence of halogens and sulfur in the effluent of a chromatographic column, comprising in combination:
   a burner coupled to the outlet of said column for burning said effluent;
   a source of electrolyte;
   a pair of glass rods supported over said burner at an angle with the horizontal;
   means for supplying electrolyte from said source to the uppermost end of said rods to form a thin film of flowing electrolyte on the lower surfaces of said rods;
   means for directing the products of combustion of said burner onto said thin film of electrolyte in an area intermediate the ends of said rods;
   a pair of electrodes disposed between said rods and immersed in said thin film; and
   indicating means coupled to said electrodes for indicating changes in conductivity in said thin film resulting from the dissolution of said halogens and sulfur in said thin film.

9. The detector of claim 8 wherein a first of said electrodes is upstream of the area of said thin film onto which said products of combustion are directed, and the other of said electrodes is downstream of said area.

10. The detector of claim 9 wherein said electrodes are silver-silver chloride electrodes.

11. A detection system for determining the constituents present in the effluent of a chromatographic column, comprising in combination:
a hydrogen flame ionization detector coupled to the outlet of said column; said detector including a burner flame for burning said effluent and a protective housing surrounding said burner flame;
electrical circuit means for indicating changes in ionization in said flame;
means for forming a thin film of flowing electrolyte;
means for directing the products of combustion of said detector from said protective housing onto said thin film of electrolyte; and
means for sensing changes in conductivity of said thin film resulting from the dissolution of said products of combustion in said thin film.

12. A detection system for determining the constituents present in the effluent of a chromatographic column, comprising in combination:
a hydrogen flame ionization detector coupled to the outlet of said column, said detector including a burner flame for burning said effluent and a protective housing surrounding said burner flame;
electrical circuit means for indicating changes in ionization in said flame;
means for forming a thin film of flowing electrolyte;
means for directing the products of combustion of said detector from said protective housing onto said thin film of electrolyte;
a pair of electrodes immersed in said thin film; and
indicating means coupled to said electrodes for indicating changes in conductivity in said stream resulting from the dissolution of said products of combustion in said thin film.

13. A detection system for determining the constituents present in the effluent of a chromatographic column, comprising in combination:
a hydrogen flame ionization detector coupled to the outlet of said column, said detector including a burner flame for burning said effluent and a protective housing surrounding said burner;
electrical circuit means for indicating changes in ionization in said flame;
a source of electrolyte;
a pair of glass rods supported over said detector at an angle with the horizontal;
means for supplying electrolyte from said source to the uppermost end of said glass rods to form a thin film of flowing electrolyte on the lower surface of said rods;
means for directing the products of combustion of said detector from said protective housing onto said thin film of electrolyte in an area intermediate the ends of said rods;
a pair of electrodes disposed between said rods and immersed in said thin film; and
electrical circuit means, said electrical circuit means including means for impressing a potential across said electrodes and means for indicating changes in conductivity in said thin film resulting from the dissolution of said products of combustion in said thin film.

References Cited in the file of this patent
UNITED STATES PATENTS

| | | |
|---|---|---|
| 2,593,878 | Haines et al. | Apr. 22, 1952 |
| 3,001,917 | Scheirer | Sept. 26, 1961 |